United States Patent [19]
Willey et al.

[11] Patent Number: 5,433,071
[45] Date of Patent: Jul. 18, 1995

[54] APPARATUS AND METHOD FOR CONTROLLING NOXIOUS COMPONENTS IN AUTOMOTIVE EMISSIONS USING A CONDITIONING CATALYST FOR REMOVING HYDROGEN

[75] Inventors: Raymond L. Willey, Redford; Robert W. McCabe, Lathrup Village; Jeffrey S. Hepburn, Dearborn, all of Mich.

[73] Assignee: Ford Motor Company, Dearborn, Mich.

[21] Appl. No.: 172,997

[22] Filed: Dec. 27, 1993

[51] Int. Cl.$^6$ .................................... F01N 3/20
[52] U.S. Cl. ........................... 60/274; 60/276; 60/285
[58] Field of Search ............... 60/274, 276, 277, 285

[56] References Cited
U.S. PATENT DOCUMENTS

| | | | |
|---|---|---|---|
| 4,251,990 | 2/1981 | Norimatsu et al. | 60/276 |
| 4,256,074 | 3/1981 | Sugasawa et al. | |
| 4,274,373 | 6/1981 | Sugasawa et al. | |
| 5,052,177 | 10/1991 | Nada | 60/274 |
| 5,083,427 | 1/1992 | Anderson | 60/274 |
| 5,157,920 | 10/1992 | Nakaniwa | 60/274 |
| 5,158,058 | 10/1992 | Yoshida et al. | 123/434 |
| 5,230,322 | 7/1993 | Curran et al. | 123/694 |

OTHER PUBLICATIONS

"Characteristics of a Zirconia Oxygen Sensor In Oxygen–Combustible Gas Mixtures", by Takashi Takeuchi et al., The Electrochemical Soc. Extended Abstracts, Abstract No. 74, Pittsburgh, Pa., Oct. 15–20, 1978, pp. 196–198.

"EMF Characteristics of Zirconia Oxygen Sensor in Nonequilibrium Gas Mixtures Containing Combustible Gas and Oxygen", by Keiichi Saji et al., Proceedings Of The 1st Sensor Symposium, 1981, pp. 103–107.

"A Comparison Between the Combustion of Isooctane, Methanol, and Methane in Pulse Flame Combustors With Closed Loop A/F Control", by Jeffrey S. Hepburn, SAE Technical Paper Series, Article #920799, International Congress & Exposition, Detroit, Mich., Feb. 24–28, 1992, pp. 151–157.

Primary Examiner—Douglas Hart
Attorney, Agent, or Firm—Roger L. May; Joseph W. Malleck

[57] ABSTRACT

The invention relates to an improved emission control system. The system has particular applicability for use in an internal combustion engine (10) utilizing alternative fuels such as natural gas. More particularly, the invention provides an apparatus and method wherein hydrogen is removed by a conditioning catalyst (16) from the exhaust gas stream (21) to produce a conditioned exhaust gas (22). An exhaust gas oxygen (EGO) sensor (18) is in communication with the conditioned exhaust gas (22) and generates a signal in response to the sensed oxygen concentration of the conditioned exhaust gas (22). The A/F mixture entering engine (10) is adjusted by closed loop control means (14) in response to the signal generated by EGO sensor (18). The removal of hydrogen from the exhaust gas stream (21) eliminates lean shifts and allows oxygen sensor (18) and closed loop control means (14) to more accurately control the A/F ratio. As a result of improved control over the A/F mixture entering engine (10), main three-way catalyst (20) optimally converts noxious components present in the conditioned exhaust gas (22) to produce a purified exhaust stream (23).

17 Claims, 3 Drawing Sheets

APPARATUS AND METHOD FOR CONTROLLING NOXIOUS COMPONENTS IN AUTOMOTIVE EMISSIONS USING A CONDITIONING CATALYST FOR REMOVING HYDROGEN

TECHNICAL FIELD

The invention generally relates to the control of noxious components in exhaust gas streams of internal combustion automotive engines. More particularly, the invention relates to an apparatus and method for the control of noxious components using a conditioning catalyst preferentially capable of removing hydrogen from the automotive exhaust stream.

BACKGROUND ART

The combustion of air/fuel mixtures in internal combustion engines, such as those found in automobiles, produces an exhaust gas stream comprised of various gaseous components. Some of these components, such as hydrocarbons (HC), carbon monoxide (CO), and oxides of nitrogen ($NO_x$), may be termed noxious components. Those skilled in the art will appreciate that oxides of nitrogen refers to both NO and $NO_2$. Environmental concerns have led to ever stricter regulations concerning the maximum allowed emissions of these particular components.

Attempts to eliminate or control these noxious components have most recently involved the use of three-way catalysts (TWC). Such catalysts typically oxidize HC and CO, while simultaneously reducing $NO_x$. The exhaust gas stream is typically passed through a combination of noble metals coated onto a stabilized alumina substrate carried on a monolithic ceramic or metallic cellular core. The three-way catalysts are commonly designed so that the exhaust stream or emissions pass therethrough along a straight uninterrupted axial flow.

However, optimizing both the oxidation of HC and CO and the simultaneous reduction of $NO_x$, requires close control of the air/fuel (A/F) ratio entering the internal combustion engine. Optimum reduction of all three components occurs when the A/F ratio is close to stoichiometric, i.e. $\sim 14.65$ kilograms of air to 1 kilogram of gasoline or $\lambda = 1$. It will be appreciated that $\lambda$ is the excess air/fuel factor and is defined by dividing the quantity of air and fuel actually supplied, by the theoretical stoichiometric air/fuel requirement.

In order to achieve and maintain the desired A/F ratio, exhaust gas oxygen (EGO) sensors and closed loop control circuits have been used in conjunction with three-way catalysts. Such emission control systems generally measure the oxygen concentration of the exhaust gas and adjust the relative amounts of air and fuel supplied to the engine in response thereto. EGO sensors provide a feedback adjustment whenever the air/fuel ratio is other than a predetermined level, i.e. $\lambda = 1$, to indicate whether the mixture is richer ($\lambda < 1$) or leaner ($\lambda > 1$) than $\lambda = 1$. This level is known as the closed loop control point and, within narrow limits, may be selected as desired, i.e. other than $\lambda = 1$.

U.S. Pat. No. 5,083,427 to Anderson, commonly assigned, discloses an apparatus system to control unwanted emissions from an automotive engine. The system has a low mass three-way filter catalyst, a high mass three-way main catalyst downstream of the filter catalyst, a continuous universal exhaust gas oxygen sensor (UEGO) positioned between the filter and main catalysts to indicate the level of oxygen in the exhaust stream exiting the filter catalyst, and highly sophisticated proportional control means for adjusting in closed loop the A/F ratio entering the engine in interactive response to a deviation of the sensed oxygen level from a target level. Anderson does not teach that hydrogen must be removed from the exhaust gas stream.

The universal exhaust gas oxygen sensor employed by Anderson has a very fast response, typically 60 milliseconds, or 16.7 Hz. Without a filter catalyst, the sensor will not provide optimum control because it will respond to high frequency (i.e. >10 Hz) "chemical noise" rather than to the mean oxygen level in the exhaust. According to Anderson, the filter catalyst buffers these fluctuations to 4 Hz or less, thereby providing the UEGO sensor with exhaust gas more representative of the chemical mean. The Anderson filter catalyst buffers the sensed oxygen concentration by masking the effect of unpredictable oxygen deviations, (i.e. individual cylinder events, PCV and air distribution) and compensating for predictable oxygen level deviations.

Although such systems have been found to be useful, their accuracy and effectiveness is impaired with the use of various alternative automotive fuels. Alternative fuels may be generally defined as those other than traditional gasoline and diesel fuels. Illustrative examples are natural gas, methanol, methane, propane (LPG), ethanol and combinations of these fuels such as methanol/gasoline or gasoline/ethanol fuel mixtures. Natural gas is herein defined as fuel consisting mostly of methane with small and varying amounts of ethane, propane, butane and other inert gases.

Experiments have indicated that the combustion of such alternative fuels generally results in a significant lean shift of the closed loop control point. See Hepburn, J. S., "A COMPARISON BETWEEN THE COMBUSTION OF ISOOCTANE METHANOL, AND METHANE IN PULSE FLAME COMBUSTORS WITH CLOSED LOOP A/F CONTROL", SAE Technical Paper 920799, International Congress and Exposition, Detroit, Mich., Feb. 24-28 1992.

These shifts in the closed loop oxygen sensor control point are believed to be due to the difference in the gas diffusion rates of low molecular weight components present in the exhaust gas stream. As compared to gasoline exhaust streams, the exhaust gas streams produced from the combustion of alternative fuels in internal combustion engines typically contain higher concentrations of low molecular weight components like hydrogen.

It is believed that the low molecular weight of the hydrogen gas allows it to preferentially diffuse through the protective spinel sheath surrounding the electrode of the typical EGO sensor. As a result, the relative hydrogen concentration at the inner surface of the sheath is greater than the relative hydrogen concentration at the outer surface of the sheath. The higher relative hydrogen concentration at the electrode surface causes the EGO sensor to detect a richer gas mixture than is actually present in the bulk gas surrounding the protective spinel sheath. As a result, the EGO sensor experiences a "shift". Such shifts occur in both switching type sensors, (i.e. EGO, HEGO) and continuous type sensors (i.e. UEGO). They occur under both steady-state and transient conditions and are unrelated to the high frequency chemical noise cited by Anderson.

In general, lean shifts result in inaccurate control of the air/fuel mixture entering the engine. That is, because the EGO sensor believes the air/fuel mixture to be richer in fuel than it is, the closed loop control system directs a reduction in the amount of fuel entering the engine and a concurrent increase in air. The air/fuel mixture entering the engine thus becomes leaner than what it actually should be, i.e. a lean shift.

For fuels with high hydrogen to carbon ratios, such as alternative fuels like methanol and natural gas, the magnitude of the lean shift can be large, (ca 0.2–0.3 delta A/F units). Depending on the particular calibration employed, lean A/F shifts of 0.1 A/F units or less can result in reductions in $NO_x$ conversion efficiency of 20 percentage points or more.

However, it is believed that such effects may be seen to a lesser extent even with the combustion of traditional fuels like gasoline. In gasoline the effect may be responsible for less than optimum control of A/F ratios.

There is thus a need for an emission control system which will eliminate the lean shift in a closed loop control point caused by the preferential diffusion of hydrogen through the protective spinel coating of an EGO sensor. Most desirably, such an emission control system would provide for optimum reduction of noxious components like $NO_x$, HC and CO, while exhibiting long term durability and little or no loss in efficiency.

SUMMARY OF THE INVENTION

It is thus an object of the present invention to provide an emission control system and a method for the control of noxious components in exhaust streams produced by the combustion of air/fuel mixtures in internal combustion engines, wherein EGO sensor inaccuracies and errors in the control of the A/F ratio, caused by the preferential diffusion of hydrogen into the EGO sensor are diminished.

It is another object of the invention to provide an emission control system having particular applicability for use with internal combustion engines using alternative fuels.

These and other objects of the present invention have been achieved with an emission control system wherein hydrogen is removed by a conditioning catalyst from the exhaust gas stream to produce a conditioned exhaust gas. An exhaust gas oxygen (EGO) sensor is in communication with the conditioned exhaust gas and generates a signal in response to the sensed oxygen concentration of the conditioned exhaust gas. The A/F mixture entering the engine is adjusted by a closed loop control means in response to the signal generated by the EGO sensor. The removal of hydrogen from the exhaust gas stream eliminates lean shifts and allows the oxygen sensor and closed loop control means to more accurately control the A/F ratio. As a result of improved control over the A/F mixture entering the engine, the three-way catalyst optimally converts noxious components present in the conditioned exhaust gas to produce a purified exhaust stream.

The apparatus and method of the invention are advantageous because the effect of contamination upon the EGO sensor is decreased with the use of the low-volume conditioning catalyst. The conditioning catalyst acts as a filter and collection media for common exhaust contaminants such as phosphorus, silicon, zinc, manganese and the like. These contaminants might otherwise deposit on the EGO sensor and negatively affect both its control point and response characteristics.

Finally, it has been found that in some cases, the benefits achieved with the use of the apparatus and method of the instant invention allow for the potential elimination of exhaust gas recirculation systems (EGR) from some alternative fuel vehicles while still achieving ultra low emission vehicle (ULEV) emission levels. These benefits are achieved in addition to the elimination of the shifts in closed loop control point which occur when the exhaust gas stream contains disadvantageous concentrations of hydrogen.

DETAILED DESCRIPTION OF THE PREFERRED EMBODIMENT

Figure 1:
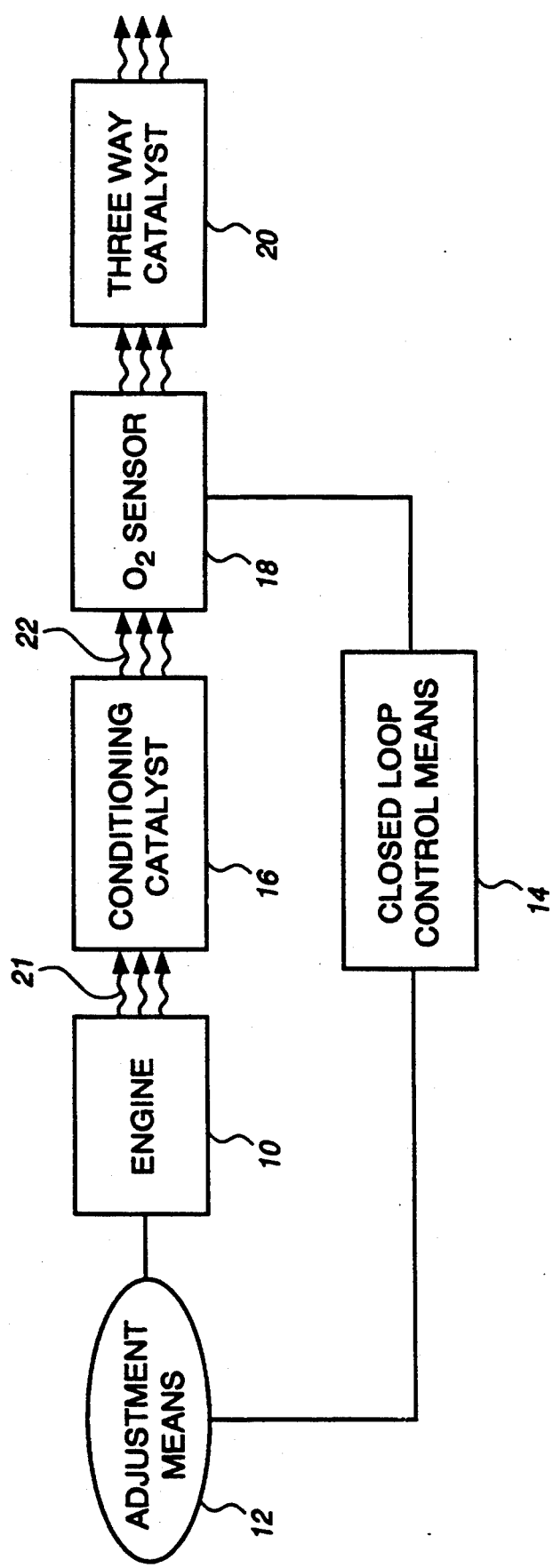
FIG. 1 is a schematic representation of the emission control system and method of the invention.

FIG. 1 provides a schematic illustration of the apparatus and method of the invention. The invention provides an emission control system wherein hydrogen is removed by a conditioning catalyst 16 from the exhaust gas stream 21 to produce a conditioned exhaust gas 22. An exhaust gas oxygen (EGO) sensor 18 is in communication with the conditioned exhaust gas 22 and generates a signal in response to the sensed oxygen concentration of the conditioned exhaust gas 22. The A/F mixture entering engine 10 is adjusted by closed loop control means 14 in response to the signal generated by EGO sensor 18. The removal of hydrogen from the exhaust gas stream 21 eliminates lean shifts and allows oxygen sensor 18 and closed loop control means 14 to more accurately control the A/F ratio. As a result of improved control over the A/F mixture entering engine 10, main three-way catalyst 20 optimally converts noxious components present in the conditioned exhaust gas 22 to produce a purified exhaust stream 23.

It will be appreciated by those skilled in the art that the engine 10 illustrated in FIG. 1 is an internal combustion engine of a type suitable for use in an automobile. Engine 10 will typically be a spark ignition engine and may use gasoline, or an alternative fuel such as those described above. Most preferably, engine 10 will use an alternative fuel such as natural gas.

Adjustment means 12 is responsible for regulating the amount of fuel and air delivered to the engine 10. Those skilled in the art will appreciate that adjustment means 12 includes any conventional fuel metering means which may be suitable for use herein.

Adjustment means 12 is controlled by closed loop control means 14. The term "closed loop control" is used to indicate that the amount of fuel delivered to engine 10 by adjustment means 12 is determined primarily by a signal generated by exhaust gas oxygen (EGO) sensor 18 and relayed to adjustment means 12 via control means 14. The signal is responsive to the concentration of oxygen in the exhaust gas. The EGO sensor signal is determined by the amount of oxygen remaining after equilibration of the exhaust gas on the surface of the platinum electrode contained in the interior of the EGO sensor.

Thus, the purpose of control means 14 is to ensure that the amount of fuel and air entering engine 10 by way of adjustment means 12 is a function of the oxygen concentration of the exhaust gas exiting the engine 10 or the conditioning catalyst 16 as sensed by EGO sensor 18. The instant invention advantageously eliminates the need for extremely complicated closed loop control means and algorithms. The emission control system of the invention will function with conventional closed loop control means which are known to those skilled in the art.

As indicated above, it is desirable to regulate the air/fuel ratio entering engine 10 and thus control the oxygen concentration of the exhaust gas exiting engine 10. This facilitates the optimum conversion of noxious components in the exhaust gas by a three-way catalyst 20. Optimum conversion may be defined as that point at which maximum concentrations of HC and CO are oxidized and maximum concentrations of $NO_x$ are reduced. Optimum conversion by the three-way catalyst will occur when $\lambda$ is at or near 1. $\lambda$ is near the stoichiometric ratio when it has a value between $\lambda = 0.993$ and $\lambda = 1.007$. When the oxygen concentration of the exhaust gas exiting the conditioning catalyst 16 is between these first and second values, the three-way catalyst 20 will be capable of optimally converting noxious components. Most preferably, the oxygen concentration of the exhaust gas exiting engine 10 will be maintained between first and second values corresponding to $\lambda = 0.997$ and $\lambda = 1.003$.

The conditioning catalyst 16 of FIG. 1 is positioned so as to be in communication with the exhaust stream exiting engine 10. Most preferably, conditioning catalyst 16 will be positioned to lie in the path of the exhaust stream so that the exhaust gases or emissions will pass through the conditioning catalyst 16 along a straight uninterrupted axial flow.

The conditioning catalyst 16 is a low volume, low reactivity, highly durable catalyst designed to preferentially oxidize hydrogen. This is achieved by sizing the conditioning catalyst 16 such that the oxidation of hydrogen to water is preferential over other competing reactions such as the oxidation of CO and HC or the reduction of $NO_x$. Conversion of these noxious components must be minimized to the extent that negligible damping of the EGO sensor results.

The conditioning catalyst 16 is most preferably comprised of a monolithic cellular substrate. Metallic and ceramic substrates such as those typically used in the construction of three-way catalysts are suitable. Cordierite and the like are examples of suitable ceramic substrate material. Ceramic substrates are most preferred. The structure of conditioning catalyst 16 is honeycombed and is analogous to that of traditional three-way catalysts. Such structures are well known to those skilled in the art.

Optionally, the monolithic catalyst substrate may have arrayed thereon a refractory inorganic oxide. Suitable examples are alumina, silica, or mixtures thereof. Most preferably, the conditioning catalyst 16 will have a refractory inorganic oxide layer comprised predominantly of alumina.

The catalyst substrate or optionally, the refractory inorganic oxide layer, will be impregnated with one or more noble metals. Suitable noble metals are palladium, platinum, iridium, rhodium, and ruthenium. However, the most preferred noble metal will be selected from the group consisting of palladium, platinum, rhodium and mixtures thereof. The most preferred noble metal for use herein is palladium.

In general, the conditioning catalyst 16 will have a loading of noble metal on the substrate of from about 20 to 400 grams per cubic foot (g/ft3). Preferred loadings will be from about 20 to 150 g/ft$^3$. The most preferred loading is 40 g/ft$^3$. Such relatively "light" loadings of noble metals are possible because the conditioning catalyst 16 need not function as a traditional three-way catalyst.

The ability of the conditioning catalyst 16 to preferentially oxidize hydrogen is dependent upon the sizing and cell density of the conditioning catalyst 16 and the particular loading of noble metal. The conditioning catalyst 16 must operate without significantly damping the response of the exhaust gas oxygen sensor 18. With the exception of the oxygen consumed in the oxidation of hydrogen, the oxygen concentration of the conditioned exhaust gas 22 exiting conditioning catalyst 16 should approximate, as close as possible, that of the exhaust gas 21 exiting the engine 10.

Materials which are believed to function as oxygen "sinks" are to be avoided in the conditioning catalyst 16. For example, the most preferred conditioning catalyst 16 will be free of ceria which can reversibly store oxygen via the reaction: $2CeO_2 \rightleftharpoons Ce_2O_3 + \frac{1}{2} O_2$. In particular, the oxidation of HC and CO by such stored oxygen is to be avoided. High consumption of stored oxygen is particularly disadvantageous.

It has been found that the desired performance characteristics (i.e. high conversion of hydrogen, with concomitant low damping of the EGO sensor response) are achieved when a conditioning catalyst 16 has a particular space velocity and oxygen storage capacity.

The conditioning catalyst 16 should be sized so as to yield a space velocity of from 500,000 h$^{-1}$ to 1,000,000 h$^{-1}$ at peak engine exhaust flow rates. Space velocity is defined as the volumetric flow rate of exhaust gases under standard conditions of 1 atm pressure and 20° C. temperature divided by the volume of catalyst through which the exhaust gases are passed. A most preferred maximum space velocity is about 700,000 h$^{-1}$.

With respect to oxygen storage, the conditioning catalyst must not retain more than 1000 micro-moles of oxygen atoms, as measured by the procedure described in Hepburn, J. S. and Gandhi, H. S., "THE RELATIONSHIP BETWEEN CATALYST HYDROCARBON EFFICIENCY AND OXYGEN STORAGE CAPACITY", SAE Technical Paper 920831, International Congress and Exposition, Detroit, Mich., Feb. 24–28, 1992. To do so results in delays in the EGO sensor response characteristics. More preferably, it has been found that an optimum oxygen capacity is between 500 to 1000 micro-moles of oxygen atoms.

The conditioning catalyst 16 is not intended to function as a three-way catalyst. The ability of the conditioning catalyst 16 to oxidize HC and CO while reducing $NO_x$ is not central to the practice of the invention. As indicated above, these conversions will most preferably be minimized to avoid damping of the EGO sensor.

It has been found that the conditioning catalyst 16 will most preferably reduce or convert less than 40% of the overall $NO_x$ present in the exhaust gas stream 21 exiting engine 10. However, greater conversion efficiencies are acceptable.

However, more importantly, with respect to hydrogen, it has been predicted that conversion efficiencies of over 95% can be achieved with the use of the instant invention. Thus, it will be appreciated that the passage of the exhaust gas 21, through conditioning catalyst 16, results in the production of a conditioned exhaust gas 22. The conditioned exhaust gas 22, schematically illustrated in FIG. 1, may be characterized as having a hydrogen concentration which is at least 75% less than that of the exhaust gas stream 21 exiting the internal combustion engine 10. Preferably, conditioned exhaust gas stream 22 will have 80% less hydrogen as compared to the exhaust gas stream 21 entering conditioning catalyst 16. Most preferably, conditioned exhaust gas 22 will have less than 10% of the hydrogen present in exhaust gas 21, i.e. 90% or more removal of $H_2$ by conditioning catalyst 16.

Suitable conditioning catalyst 16 may have a dimension from about 1 to 5 inches in diameter and most preferably about 2 to 3 inches in diameter. They may have a length between 2 to 5 inches and more preferably between 3 to 4 inches. In addition, the catalyst 16 will have between 75 to 400 cells per square inch (cpi). Cell densities of 100 cpi are most preferred. Those skilled in the art will appreciate that the dimensions of conditioning catalyst 16 will be somewhat dependent upon the particulars of engine 10. Example 1 below indicates particular sizing combinations which have been found to be most preferred for particular engines.

Figure 3:
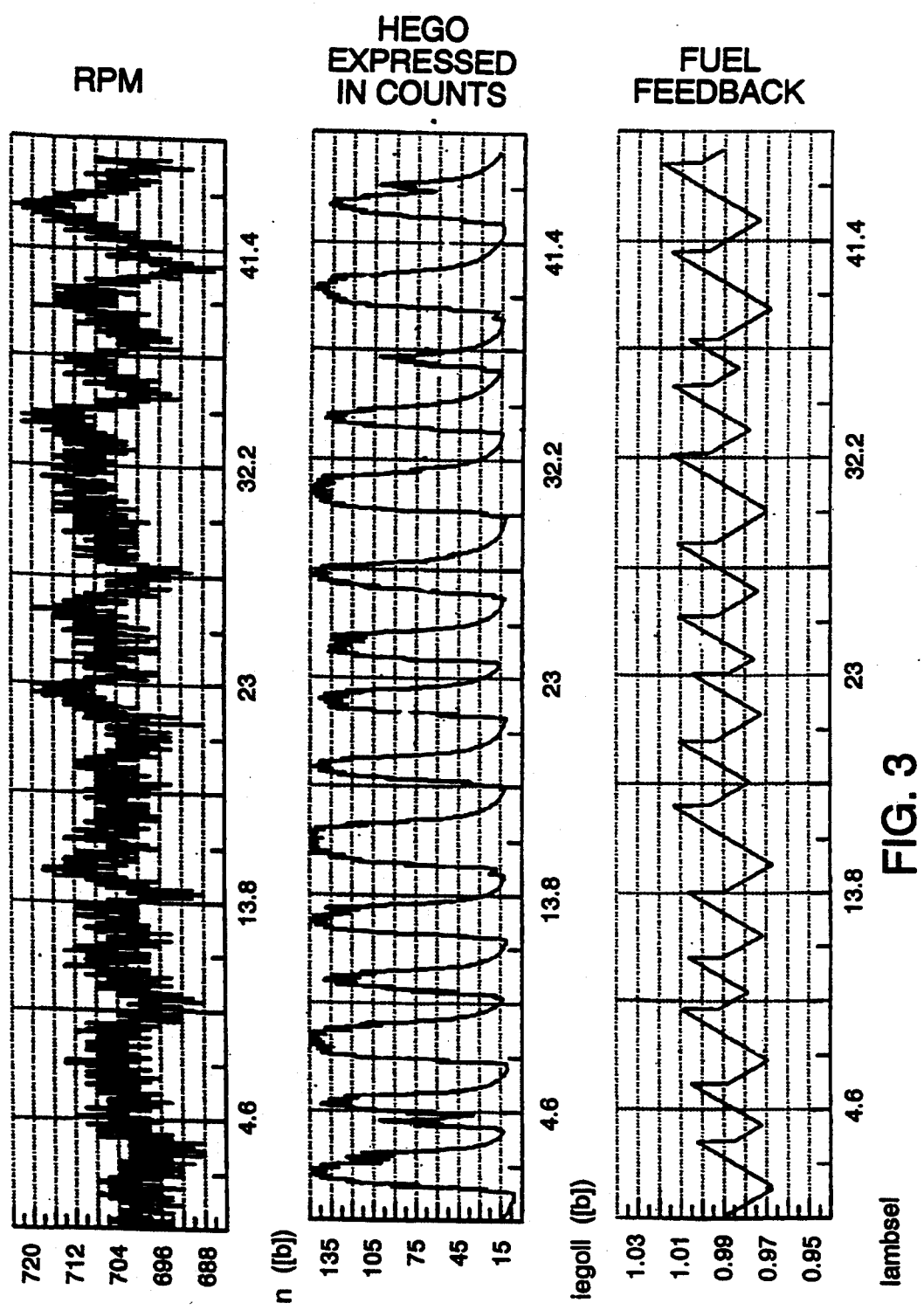
FIG. 3 illustrates acceptable feedback control achieved with a preferred embodiment of the invention.

The preferred conditioning catalyst will have sufficiently low mass, reduced oxygen storage, and high space velocity such that only a small deterioration in HEGO sensor response or frequency is produced during idle or deceleration conditions using a green or virgin conditioning catalyst. FIG. 3 illustrates acceptable feedback control at idle from the HEGO placed behind a preferred green or virgin conditioning catalyst on a 4.9 L natural gas vehicle.

With respect to EGO sensor 18, EGO sensors which are of a switching type or step function are suitable for use herein. Both heated exhaust gas (HEGO) sensors and universal exhaust gas (UEGO) sensors are suitable. HEGO's are preferred. In general, the EGO sensor will be comprised of a ceramic body having at least one portion in communication with the conditioned exhaust stream 22 exiting conditioning catalyst 16 and a second portion not located in the conditioned exhaust stream 22. The surface of the ceramic body, typically comprised of zirconium dioxide, is provided with gas permeable electrodes. Suitable electrodes may be comprised of platinum. When the oxygen concentration at that portion of the ceramic body which is in communication with the exhaust gas 22 differs from the oxygen concentration at that portion of the body not in communication with the exhaust path, a voltage is generated between the two electrodes. The voltage is a measure of the difference in the oxygen concentrations at the respective portions of the sensor body.

As indicated above, most preferably, EGO sensor 18 will be of a variety known as a HEGO. A HEGO has a ceramic body heated by an internal heating element. Most preferred HEGO sensors are those commercially available from Bosch and NTK.

Standard three-way catalysts are suitable for use herein. In particular, suitable three-way catalysts will be comprised of a ceramic or metallic monolithic substrate having a noble metal impregnated thereon such as those commonly available from Corning, Inc. of Corning, N.Y. Suitable noble metals are those as described above with respect to conditioning catalyst 16. Most preferably, the noble metal will be selected from the group consisting of palladium, platinum, rhodium, and mixtures thereof. Total loadings of noble metal from 40 g/ft$^3$ to 150 g/ft$^3$ are suitable. The most preferred combination is 100 g/ft$^3$ of palladium and 4 g/ft$^3$ of rhodium.

Three-way catalysts suitable for use in the invention will have from 350 to 400 cells per square inch and a maximum space velocity of 100,000 h$^{-1}$ at wide open throttle conditions. The most preferred three-way catalyst is commercially available from Engelhard, Inc. of Menlo Park, N.J.

Figure 2:
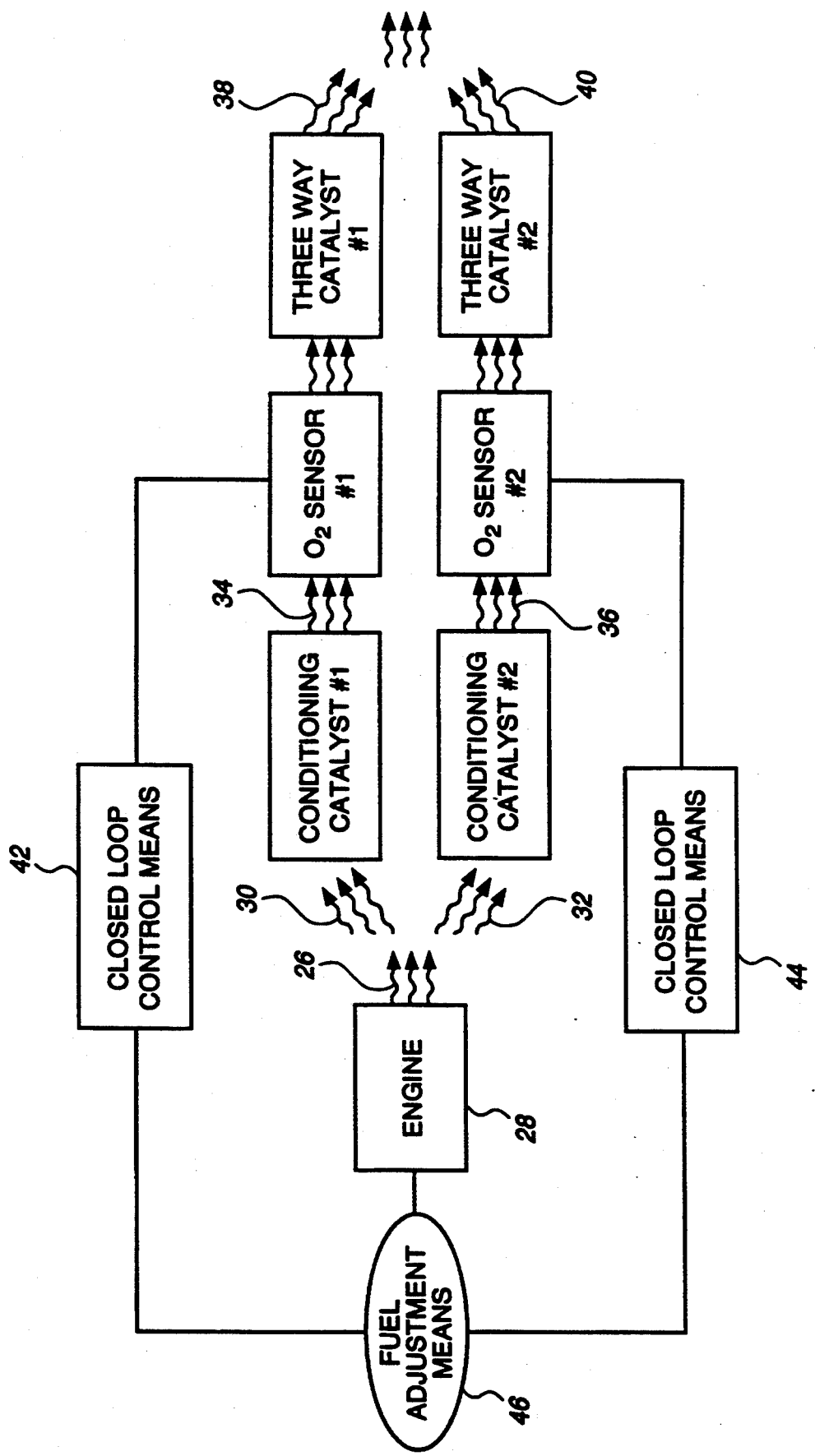
FIG. 2 is a schematic representation of a preferred embodiment of the emission control system of the invention.

A preferred embodiment of the instant invention is illustrated in FIG. 2. As disclosed therein, the exhaust gas 26, exiting from engine 28, is divided into first exhaust gas stream 30 and second exhaust gas stream 32. Exhaust stream 30 is passed through a first catalyst staging while exhaust stream 32 is passed through a second catalyst staging.

The first catalyst staging consists of conditioning catalyst no. 1. oxygen sensor no. 1 and three-way catalyst no. 1. The second catalyst staging respectively consists of conditioning catalyst no. 2, oxygen sensor no. 2, and three-way catalyst no. 2. It will be appreciated that conditioning catalyst no. 1 and conditioning catalyst no. 2 operate as described above and respectively result in the production of conditioned exhaust gas streams 34 and 36. Similarly, both three-way catalyst no. 1 and three-way catalyst no. 2 respectfully result in the production of purified exhaust gas streams 38 and 40. Alternately, gas streams 34 and 36 may be combined at a point downstream of oxygen sensors 1 and 2 and passed through one large three-way converter. Purified exhaust gas streams 38 and 40 may or may not be combined prior to exhaust to the atmosphere.

It will be appreciated that in FIG. 2 the closed loop control means 42 and 44 and fuel adjustment means 46 are as described above.

The advantage of the catalyst staging system illustrated in FIG. 2 is that elimination of low molecular weight components such as hydrogen may be optimized without the occurrence of undesirable damping in the EGO sensor response.

The following examples are provided to illustrate, but not limit, the invention.

EXAMPLE 1

The effect of the sizing of the conditioning catalyst was examined based on a mathematical model of steady-state catalyst operation. The model contains kinetic data derived for a standard three-way automotive catalyst aged to the 4,000 mile level.

| Engine | Geometry of Conditioning Catalyst | Predicted $H_2$ % Converted Temp: 1250° F. | % CO Converted |
|---|---|---|---|
| 4.9 L | 100 cpi/2" dia. × 3" long/88 SCFM flow | 82.7% | 44% |
| 4.9 L | 100 cpi/2" dia. × 4" long/88 SCFM flow | 88.5% | 52% |
| 4.9 L | 100 cpi/2.65" dia. × 4" long/88 SCFM | 96% | 68% |
| 5.4 L | 200 cpi/2.65" dia. × 4" long/145 SCFM | 97.5% | 73% |

This example illustrates that the sizing of the conditioning catalyst does affect the conversion efficiency of the catalyst with respect to hydrogen. i0 The model calculations were carried out for exhaust flow rates (per engine bank) near the rated values for the particular engine displacements indicated.

EXAMPLE 2

The emissions control system of the instant invention was utilized in a 4.9 L natural gas vehicle having no EGR and with a measured road resistance of 7,000#I.W. and 17.8 P.A.U. The conditioning catalyst had a 2 inch diameter, 3 inch length, 100 cpi, and 100 g/ft$^3$ of palladium. The results are as follows with all values reported as g/mile over the 1975 U.S. Federal Test Procedure:

| Durability | Gas Stream | HC/NMHC | CO | NO$_x$ |
|---|---|---|---|---|
| Zero mile | Exhaust Gas | 2.4 | 20 | 5.0 |
| | Conditioned Exhaust Gas | 1.8 | 10 | 3.7 |
| | Purified Exhaust Gas | 0.32/.045 | 0.75 | 0.16 |
| 15,000 mile | Exhaust Gas | 2.4 | 19.0 | 5.4 |
| | Conditioned Exhaust Gas | 2.2 | 12.0 | 2.1 |
| | Purified Exhaust Gas | .36/.052 | 1.0 | 0.16 |
| ULEV Std | | /.117 | 2.5 | .6 |

The above results clearly indicate that highly desirable levels of noxious components are present in the purified exhaust gas stream and that such conversions occur primarily in the main three-way catalyst. Conversions of hydrogen cannot be readily measured in vehicle exhaust but can be inferred to be greater than 80% based on the measured CO conversions and the model calculations given in Example 1.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

We claim:

1. An emission control system for controlling noxious components from an exhaust stream produced by the combustion of an air/fuel mixture in an internal combustion engine, the system comprising:
   a conditioning catalyst, in communication with the exhaust stream, the catalyst being sized to preferentially oxidize hydrogen from the exhaust stream, the catalyst being capable of removing hydrogen from the exhaust stream to provide a conditioned exhaust stream;
   an exhaust gas oxygen sensor, in communication with the conditioned exhaust stream, capable of sensing an oxygen concentration of the conditioned exhaust stream and generating a signal in response to the sensed oxygen concentration;
   a three-way catalyst, in communication with the conditioned exhaust stream, capable of eliminating noxious components from the conditioned exhaust stream to produce a purified exhaust stream; and
   control means for adjusting the air/fuel mixture entering the engine, the control means operating in response to the signal generated by the oxygen sensor, wherein the removal of the hydrogen from the exhaust stream improves the accuracy of the oxygen sensor and reduces deviations in the actual air/fuel mixture entering the engine from a desired ratio.

2. The system of claim 1 where the conditioning catalyst removes at least 75% of the hydrogen present in the exhaust stream.

3. The system of claim 2 where the conditioning catalyst removes at least 80% of the hydrogen present in the exhaust gas stream.

4. The system of claim 3 where the conditioning catalyst removes more than 90% of the hydrogen in the exhaust gas stream.

5. The system of claim 1 where the conditioning catalyst has a space velocity which results in negligible damping upon the oxygen sensor.

6. The system of claim 5 where the conditioning catalyst has a space velocity of from 500,000 h$^{-1}$ to 1,000,000 h$^{-1}$.

7. The system of claim 1 which has the capacity to store less than 1000 micro-moles of oxygen atoms.

8. The system of claim 7 where the conditioning catalyst stores between 500 and 1000 micro-moles of oxygen atoms.

9. The system of claim 1 where the conditioning catalyst has between 100 to 400 cpi, a diameter of less than 4.0 inches, and a length of less than 5.0 inches.

10. The system of claim 1 where the exhaust gas stream is produced by the combustion of an air/fuel mixture in an internal combustion engine, the fuel being selected from the group consisting of gasoline, natural gas, propane (LPG), methane, methanol, ethanol, and mixtures thereof.

11. A method for controlling noxious components in an exhaust stream produced by the combustion of an air/fuel mixture in an internal combustion engine, the process comprising:
   positioning a low volume conditioning catalyst in communication with the exhaust stream, the low volume conditioning catalyst being sized to eliminate at least 75% of the hydrogen present in the exhaust gas stream exiting the internal combustion engine;
   sensing an oxygen concentration of the conditioned exhaust stream and generating a signal in response to the sensed oxygen concentration;
   adjusting the air/fuel mixture entering the engine, in response to the signal generated by the oxygen sensor, in order to maintain the oxygen concentration of the exhaust stream between a first and a second value; and
   eliminating noxious components from the conditioned exhaust stream to produce a purified exhaust stream, optimum elimination occurring when the oxygen concentration of the exhaust stream is between the first and second value, wherein removal of hydrogen from the exhaust stream improves the accuracy of the oxygen sensor and hence the maintenance of the oxygen concentration of the exhaust stream between the first and second value.

12. The method of claim 11 where the low volume conditioning catalyst removes at least 80% of the hydrogen present in the exhaust gas stream exiting the internal combustion engine.

13. The method of claim 12 where the low volume conditioning catalyst removes more than 90% of the hydrogen present in the exhaust gas stream exiting the internal combustion engine.

14. The method of claim 11 further comprising:
providing an exhaust gas oxygen sensor, in communication with the conditioned exhaust stream, capable of sensing an oxygen concentration of the conditioned exhaust stream and generating a signal proportional to the sensed oxygen concentration;
providing a three-way catalyst, in communication with the conditioned exhaust stream, capable of eliminating noxious components from the conditioned exhaust stream; and
positioning a control means for adjusting the air/fuel mixture entering the engine to be in communication with the oxygen sensor, the control means operating in response to the signal generated by the oxygen sensor.

15. The method of claim 11 wherein adjusting the air/fuel mixture further comprises adjusting the air/fuel mixture entering the engine so as to maintain the oxygen concentration of the exhaust gas exiting the engine between $\lambda = 0.993$ and $\lambda = 1.007$.

16. The method of claim 11 for improving the control of noxious components in an exhaust stream produced by the combustion of an air/fuel mixture in an internal combustion engine, the fuel being selected from the group consisting of natural gas, gasoline, methane, propane, methanol, ethanol, and mixtures thereof.

17. An emission control system for removing noxious components from an exhaust stream produced by the combustion of an air/natural gas mixture in an internal combustion engine, the system comprising:

a low volume conditioning catalyst, in communication with the exhaust stream, the catalyst being sized to preferentially oxidize hydrogen from the exhaust stream to provide a conditioned exhaust stream, the catalyst being capable of removing at least 75% of the hydrogen present in the exhaust gas stream;

an exhaust gas oxygen sensor, in communication with the conditioned exhaust stream, capable of sensing an oxygen concentration of the conditioned exhaust stream and generating a signal in response to the sensed oxygen concentration;

a three-way catalyst, in communication with the conditioned exhaust stream, capable of eliminating noxious components from the conditioned exhaust stream to produce a purified exhaust stream and optimally eliminating noxious components when the oxygen concentration of the conditioned exhaust stream is between a first and second value; and control means for adjusting the air/natural gas mixture entering the engine in order to provide an engine exhaust gas stream having an oxygen concentration between the first and second value, the control means operating in response to the signal generated by the oxygen sensor, wherein the removal of hydrogen from the exhaust stream improves the accuracy of the oxygen sensor and reduces deviations in the actual air/natural gas mixture entering the engine from a value between the first and second values.

* * * * *